(12) United States Patent
Ahn et al.

(10) Patent No.: US 10,084,508 B2
(45) Date of Patent: *Sep. 25, 2018

(54) FREQUENCY HOPPING PATTERN AND METHOD FOR TRANSMITTING UPLINK SIGNALS USING THE SAME

(71) Applicant: LG ELECTRONICS INC., Seoul (KR)

(72) Inventors: Joon Kui Ahn, Anyang-si (KR); Nam Yul Yu, Anyang-si (KR); Young Woo Yun, Anyang-si (KR); Ki Jun Kim, Anyang-si (KR); Hyun Wook Park, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/414,280

(22) Filed: Jan. 24, 2017

(65) Prior Publication Data

US 2017/0134068 A1 May 11, 2017

Related U.S. Application Data

(63) Continuation of application No. 14/329,218, filed on Jul. 11, 2014, now Pat. No. 9,590,693, which is a (Continued)

(30) Foreign Application Priority Data

Sep. 30, 2008 (KR) ................. 10-2008-0095842

(51) Int. Cl.
*H04B 1/7143* (2011.01)
*H04L 5/00* (2006.01)
*H04B 7/12* (2006.01)

(52) U.S. Cl.
CPC ............ *H04B 1/7143* (2013.01); *H04B 7/12* (2013.01); *H04L 5/0039* (2013.01)

(58) Field of Classification Search
CPC .......... H04B 1/707; H04B 1/69; H04B 1/713; H04B 1/7136; H04B 1/7143; H04B 1/715;
(Continued)

(56) References Cited

U.S. PATENT DOCUMENTS 6,215,810 B1   4/2001   Park
7,054,346 B2 * 5/2006   Balachandran ...... H04B 1/7143
                                                                370/287
(Continued)

FOREIGN PATENT DOCUMENTS

CN   1883137       12/2006
CN   101159460     4/2008
(Continued)

OTHER PUBLICATIONS

NEC Group, "Frequency Hopping Pattern for EUTRA Uplink", R1-073468, TSG-RAN WG1#50, Aug. 2007.
(Continued)

*Primary Examiner* — Chi H Pham
*Assistant Examiner* — Weibin Huang
(74) *Attorney, Agent, or Firm* — Lee Hong Degerman Kang Waimey

(57) ABSTRACT

A method for performing uplink transmission in a time domain transmission unit includes receiving, from a base station, hopping-mode information indicating whether a frequency hopping is an inter-slot hopping or an inter-subframe hopping and performing the uplink transmission using a resource block in the time domain transmission unit.

20 Claims, 8 Drawing Sheets

Related U.S. Application Data continuation of application No. 13/453,988, filed on Apr. 23, 2012, now Pat. No. 8,817,739, which is a continuation of application No. 12/680,989, filed as application No. PCT/KR2008/005776 on Oct. 1, 2008, now Pat. No. 8,416,835.

(60) Provisional application No. 60/976,579, filed on Oct. 1, 2007, provisional application No. 60/982,434, filed on Oct. 25, 2007, provisional application No. 60/991,183, filed on Nov. 29, 2007, provisional application No. 61/012,030, filed on Dec. 6, 2007, provisional application No. 61/014,428, filed on Dec. 17, 2007.

(58) Field of Classification Search
CPC .... H04B 2001/7152; H04B 2001/7154; H04B 1/7156; H04J 13/00
See application file for complete search history.

(56) References Cited

U.S. PATENT DOCUMENTS

| | | | | |
|---|---|---|---|---|
| 7,177,297 | B2* | 2/2007 | Agrawal | H04B 1/713 370/328 |
| 7,580,444 | B2* | 8/2009 | Brown | H04B 1/7143 342/150 |
| 7,768,987 | B2 | 8/2010 | Rahman et al. | |
| 8,170,080 | B2* | 5/2012 | Arnott | H04B 1/7143 370/322 |
| 8,817,739 | B2 | 8/2014 | Ahn et al. | |
| 9,374,131 | B2* | 6/2016 | Chen | H04B 1/7143 |
| 9,590,693 | B2* | 3/2017 | Ahn | H04B 1/7143 |
| 2007/0093252 | A1 | 4/2007 | Rahman et al. | |
| 2008/0089286 | A1* | 4/2008 | Malladi | H04B 1/7143 370/330 |
| 2008/0212532 | A1* | 9/2008 | Heo | H04B 1/7143 370/330 |
| 2014/0321510 | A1 | 10/2014 | Ahn et al. | |

FOREIGN PATENT DOCUMENTS

| | | |
|---|---|---|
| DE | 10211235 | 10/2003 |
| EP | 1178617 | 2/2002 |
| KR | 1020070009232 | 1/2007 |
| WO | 2005125262 | 12/2005 |

OTHER PUBLICATIONS

Samsung, "UL LFDMA with hopping in PUSCH", R1-073537, 3GPP RAN WG1 Meeting #50, Aug. 2007.
LG Electronics, "Frequency hopping method for PUSCH", R1-074209, 3GPP TSG RAN WG1 #50bis, Oct. 2007.
Qualcomm Europe, "PUSCH and PUCCH hopping patterns", R1-073264, 3GPP TSG-RAN WG1 #50, Aug. 2007.
Motorola, "UL Sounding RS for E-UTRA", R1-073757, 3GPP TSG RAN WG1 #50, Aug. 2007.
Alcatel-Lucent, "Signaling of Frequency Hopping for UL Transmission", R1-073773, 3GPP TSG-RAN WG1 #50, Aug. 2007.
European Patent Office Application Serial No. 15002791.0, Search Report dated Jan. 29, 2016, 5 pages.
Taiwan Intellectual Property Office Application Serial No. 097137758, Office Action dated Nov. 13, 2012, 6 pages.
NEC Group, "Frequency Hopping Pattern for EUTRA Uplink," TSG-RAN WG1#51, R1-074723, Nov. 2007, 4 pages.

* cited by examiner

FREQUENCY HOPPING PATTERN AND METHOD FOR TRANSMITTING UPLINK SIGNALS USING THE SAME

CROSS-REFERENCE TO RELATED APPLICATIONS

This application is a continuation of U.S. patent application Ser. No. 14/329,218, filed on Jul. 11, 2014, now U.S. Pat. No. 9,590,693, which is a continuation of U.S. patent application Ser. No. 13/453,988, filed on Apr. 23, 2012, now U.S. Pat. No. 8,817,739, which is a continuation of U.S. patent application Ser. No. 12/680,989, filed on Jul. 16, 2010, now U.S. Pat. No. 8,416,835, which is the National Stage filing under 35 U.S.C. 371 of International Application No. PCT/KR2008/005776, filed on Oct. 1, 2008, which claims the benefit of earlier filing date and right of priority to Korean Application No. 10-2008-0095842, filed on Sep. 30, 2008, and also claims the benefit of U.S. Provisional Application No. 61/014,428, filed on Dec. 17, 2007, 61/012,030, filed on Dec. 6, 2007, 60/991,183, filed on Nov. 29, 2007, 60/982,434, filed on Oct. 25, 2007, and 60/976,579, filed on Oct. 1, 2007, the contents of which are all incorporated by reference herein in their entirety.

TECHNICAL FIELD

The present invention relates to a mobile communication system, and more particularly, to a method for efficiently establishing frequency hopping and a method for transmitting uplink signals using the same.

BACKGROUND ART

In a multiple carrier cellular mobile communication system, a frequency hopping method is used to obtain frequency diversity for improving receiving performance of a base station with respect to a packet transmitted from a user equipment (UE) to an uplink. The frequency hopping method means that a spectrum of a carrier modulated by an information signal is hopped within a wide and constant frequency band.

This frequency hopping method is mainly used in either an anti-jamming system for impeding an influence of jamming which is an impedance signal serving to intentionally or non-intentionally deteriorate performance of the communication system, or a communication system in which many users share a common channel. Frequency hopping can be used to improve sensitivity to slow fading and to improve a carrier to interference (C/I) margin in a cellular wireless telephone system.

It is preferable that frequency topping used to transmit uplink signals as described above satisfies the following requirements.

First of all, the frequency hopping should ensure frequency diversity.

Second, the frequency hopping should ensure interference randomization.

The above requirements are regarded as basic requirements for frequency hopping.

In addition, in a wireless communication system, which uses multiple carriers, including 3GPP LTE system, SC-FDMA mode is adopted for uplink signal transmission. In other words, DFT is performed for a transport signal to solve a problem such as PAPR in uplink transmission, whereby a feature similar to that of single carrier transmission can be obtained.

In this regard, frequency hopping should ensure a single carrier feature for uplink transmission. To this end, uplink signals are preferably arranged in continuous frequency regions.

Meanwhile, uplink transmission of a specific user equipment (UE) can be performed through a specific frequency region in accordance with frequency selective scheduling of a base station. Uplink transmission of a user equipment which uses frequency hopping is preferably established so as not to collide with a signal of a user equipment (UE) which follows frequency selective scheduling. Accordingly, a frequency hopping pattern should be established considering frequency selective scheduling.

DETAILED DESCRIPTION OF THE INVENTION

Technical Problems

Accordingly, the present invention is directed to a method for efficiently establishing a frequency hopping pattern and a method for transmitting uplink signals using the same, which substantially obviate one or more problems due to limitations and disadvantages of the related art.

An object of the present invention is to provide a method for establishing a frequency hopping pattern which satisfies the aforementioned requirements and efficiently transmitting uplink signals using the frequency hopping pattern.

Technical Solutions

In one aspect of the present invention, a method for transmitting uplink signals in time domain transmission unit of a predetermined size comprises mapping the uplink signals with a specific resource block index is accordance with a predetermined frequency hopping pattern; and transmitting the uplink signals through a resource block corresponding to the mapped resource block index, wherein the predetermined frequency hopping pattern is defined to include subband hopping performed over one or more subbands divided from a system band for transmission of the uplink signals, and the subband hopping is defined that a resource block index used for transmission of the uplink signals in the specific time domain transmission unit becomes an index obtained by allowing a predetermined reference index to undergo cyclic shift, as much as a specific integer multiple of the number of resource blocks included in the one subband, within the range of a resource block region to which the frequency hopping can be applied.

At this time, the subband hopping is equally applied to transmission of uplink signals of all user equipments (UE) within a cell.

Also, the predetermined reference index is a resource block index used for transmission of the uplink signals in a time domain transmission unit followed by the specific time domain transmission unit or a resource block scheduled from a base station.

At this time, an integer value corresponding to the specific integer multiple is generated as a cell-specific random value. Specifically, the cell-specific random value is given by an m-sequence generator which uses cell-specific information as an initial value. Also, the specific integer multiple (m) is given by calculation which includes performing modular calculation for a state value (a) of a shift register of the m-sequence generator using an integer obtained by subtracting 1 from the number (M) of the subbands; and adding 1 to the modular calculated value.

Preferably, resource blocks used for transmission of uplink signals of one user equipment (UE) are located in a single subband.

Also, the method further comprises receiving uplink scheduling grant information as to whether to apply the frequency hopping. The time domain transmission unit of the predetermined size is slot or subframe. Frequency hopping according to the predetermined frequency hopping pattern is used in interlace unit in which HARQ process is operated.

Furthermore, the predetermined frequency hopping pattern is defined to further include mirroring which allows resource blocks within one subband to be arranged reversely based cm the center of the subband.

In another aspect of the present invention, a method for transmit ting uplink signals in time domain transmission unit of a predetermined size comprises mapping the uplink signals with a specific resource block index in accordance with a predetermined frequency hopping pattern; and transmitting the uplink signals through a resource block corresponding to the mapped resource block index, wherein the predetermined frequency hopping pattern is defined by combination of subband hopping, which is performed over one or more subbands divided from a system baud for transmission of the uplink signals, and mirroring where resource blocks within one subband are arranged reversely based on the center of the subband, and the subband hopping is defined that a resource block index used for transmission of the uplink signals in the specific time domain transmission unit becomes an index obtained by allowing a predetermined reference index to undergo cyclic shift, as much as a specific integer multiple of the number of resource blocks included in the one subband, within the range of a resource block region to which the frequency hopping can be applied.

Advantageous Effects

According to the aforementioned frequency hopping pattern and the method for transmitting uplink signals using the same, a frequency hopping pattern can be defined easily to ensure frequency diversity and interference randomization.

Also, as far as uplink transmission of one user equipment is performed within one subband, a single carrier feature of uplink transmission can be maintained.

Moreover, the frequency hopping can easily coexist with scheduling UE in accordance with establishment of index relation such as scheduling RB index, subband hopping, mirroring, etc.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will foe apparent to those skilled in the art that the present invention can be carried out without the detailed matters. For example, although the following description will be made based on some terminologies, the following description will not be limited to such terminologies and other terminologies may be designated as same meaning.

Meanwhile, in some cases, to prevent the concept of the present invention from being ambiguous, structures and apparatuses of the known art will be omitted, or will be shown in the form of a block diagram and/or a flow chart based on main functions of each structure and apparatus. Also, wherever possible, the same reference numbers will be used throughout the drawings and the specification to refer to the same or like parts.

In a frequency hopping pattern, one user equipment (UE) can use different frequency bands where data packets are transmitted within a time domain transmission unit for one data packet, for example, a transmission time interval (TTI). At this time, the time domain transmission unit could be a slot or subframe in accordance with requirements of the system. Also, one user equipment (UE) can use different frequency bands, in which data packets are transmitted, per retransmission of packet for same data. If two or more different frequency bands are used for one data packet or retransmission data packets, a receiving side can acquire frequency diversity gain when receiving one data packet or retransmission packets for same data.

Hereinafter, two modes, i.e., mirroring and subband hopping will be described as the aforementioned frequency hopping patterns.

First of all, mirroring according to one embodiment of the present invention suggests that all uplink signal transmission bands undergo mirroring per time domain transmission unit. In this case, "mirroring" means that frequency hopping is performed in such a manner that a resource block within a frequency band where mirroring is performed is arranged reversely based on a specific reference frequency region. Hereinafter, mirroring will be described with reference to the accompanying drawing.

Figure 1:
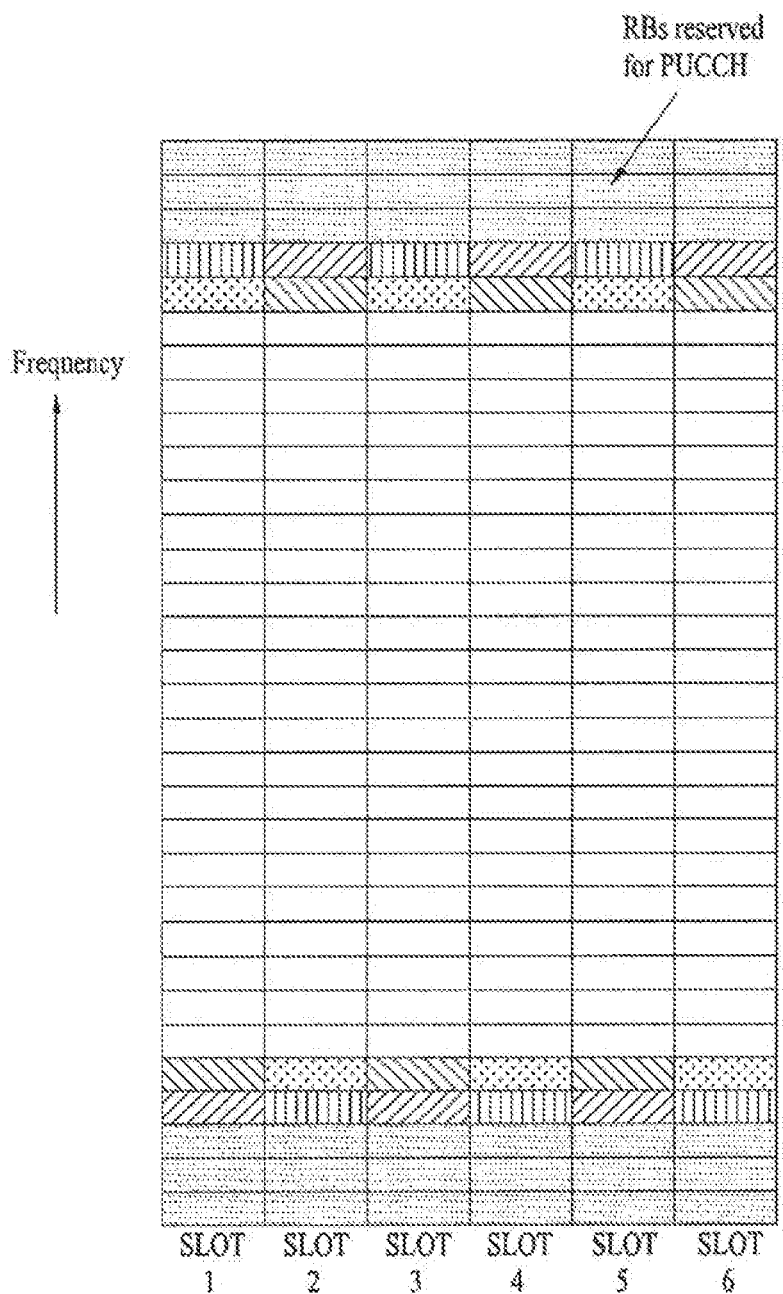
FIG. 1 is a diagram illustrating a concept of mirroring according to one embodiment of the present invention.

FIG. 1 is a diagram illustrating a concept of mirroring according to one embodiment of the present invention.

In FIG. 1, a horizontal axis represents a time domain, and a vertical axis represents a frequency region. One transmission unit in the time domain could be one slot or one subframe in accordance with a unit of frequency hopping. In the example of FIG. 1, it is assumed that the time domain transmission unit is a slog having a predetermined size (ns) and an uplink signal, which is transmitted, is a physical uplink shared channel (PUSCH) of the 3GPP LTE system.

In the 3GPP LTE system, both end parts of a system band are allocated for transmission of a physical uplink control channel (PUCCH). Accordingly, a band except for a region for PUCCH signal transmission corresponds to the system band to which frequency hopping can be applied.

First of all, four packet data transmitted from slot 0 are changed with one another in slot 1 based on the center of the system hand. The four packet data are again changed with one another in slot 2 based on the center of the system band and then transmitted to the same position as slot 3.

If frequency hopping is defined as above, it is advantageous in that frequency hopping can be defined very simply. Also, it is advantageous in that resource blocks (RB) for frequency selective scheduling can be allocated continuously.

However, if mirroring as illustrated in FIG. 1 is only used, it is difficult to obtain interference randomization. Also, frequency hopping diversity is acquired by only two types of frequency hopping patterns. Furthermore, frequency diversity through frequency hopping is varied depending on RBs allocated for specific uplink packet transmission. Moreover, frequency selectivity over a frequency selective scheduling band may be very small depending on the amount of frequency hopping RBs.

In this respect, it is preferable that the aforementioned mirroring is used if a relatively small system band is used or RBs used for frequency hopping are small. Accordingly, the preferred embodiments of the present invention, which will be described later, suggest that a system band where frequency hopping is performed is divided into one or more subbands. Also, as another frequency hopping pattern, subband hopping will be described using a concept of subband in accordance with one embodiment of the present invention. Moreover, after the aforementioned mirroring is described with respect to a concept based on subband, a method of combining subband hopping with subband based mirroring will be described.

First of all, subband hopping according to one embodiment of the present invention will be described.

Figure 2:
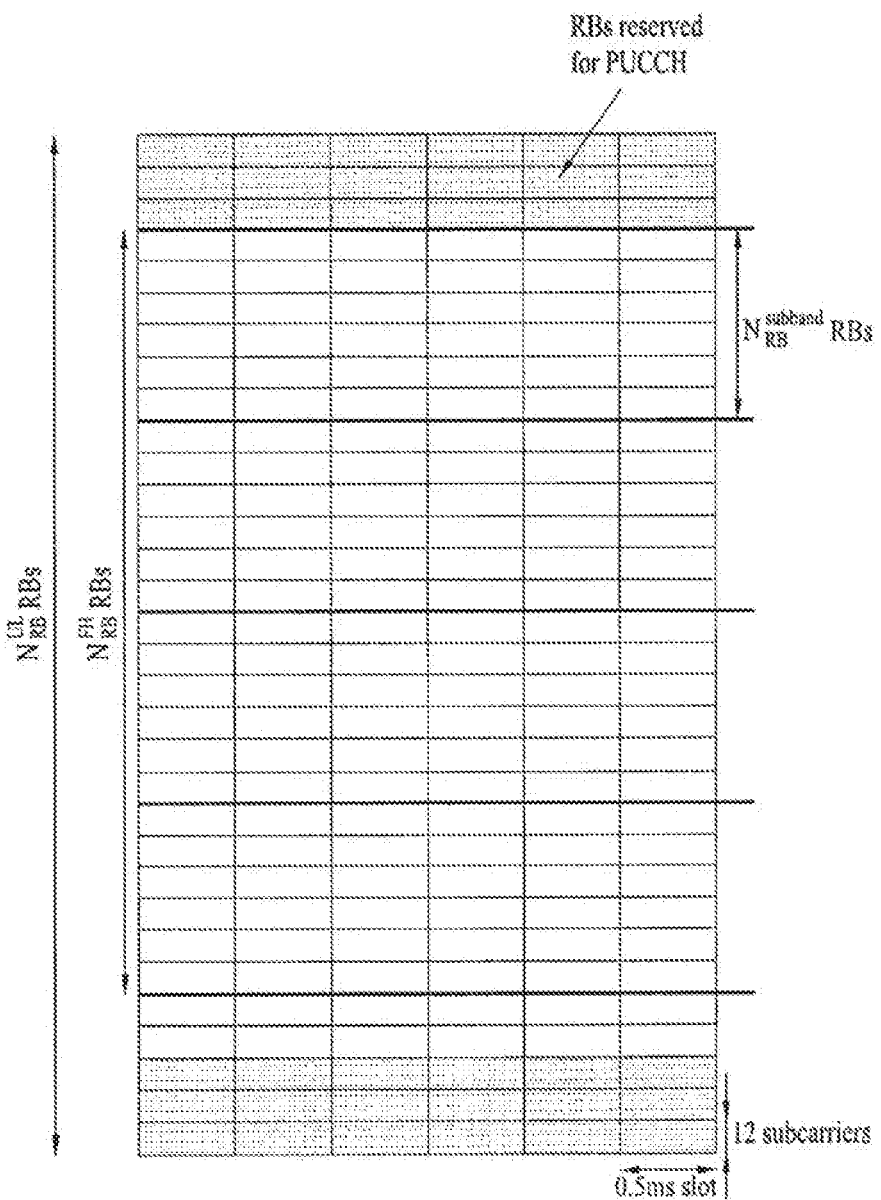
FIG. 2 is a diagram illustrating a concept of subband hopping according to one embodiment of the present invention.

FIG. 2 is a diagram illustrating a concept of subband hopping according to one embodiment of the present indention.

In subband hopping according to the embodiment of the present invention, a system band for uplink signal transmission is divided into one or more subbands. Namely, it is assumed that the system band for uplink signal transmission includes $N_{RB}^{UL}$ number of RBs and is divided into $N_{sb}$ number subbands each of which includes $N_{RB}^{sb}$ number of RBs. After the aforementioned system band is divided into one or more subbands, subband hopping can be established in such a manner that it is performed in subband unit.

In the example of FIG. 2, $N_{sb}=4$, $N_{RB}^{sb}=6$, and two RBs are not used for frequency hopping. Namely, in the embodiment of the present invention, subband hopping can be performed on a frequency region, which is divided into subbands, not the system band, wherein the frequency region includes $N_{RB}^{FH}$ ($=N_{sb} * N_{RB}^{sb}$) number of RBs. However, the example of FIG. 2 is only exemplary, and subband hopping according to the embodiment of the present invention will not limited to the aforementioned subband structure.

The embodiment of the present invention suggests that the user equipment (UE) sets RB index used for uplink transmission to become an index cyclically shifted based on a subband unit in a specific slot. Namely, the amount for moving the reference index is set to become a specific integer multiple of the number of RBs included in one subband, and the specific integer multiple can be set to a random number.

If the reference index is set to an index used in a previous slot in the detailed embodiment, a subband hopping pattern according to the embodiment of the present invention can be expressed as follows.

$$RB(t)=(RB(t-1)+\alpha(t) \cdot N_{RB}^{sb}) \bmod N_{RB}^{FH}$$ [Equation 1]

In the above Equation 1, RB(t) represents RB index (RB index given within $N_{RB}^{FH}$ RB) used for uplink transmission in the tth slot (or subframe). Accordingly, in case of the first slot (or subframe), an uplink signal is transmitted using RB index scheduled from the base station.

Also, a(t) represents a cell-specific random number generated within the range of 1 to $N_{sb}-1$. In this case, it is preferable that a value of a(t) in a specific time is commonly applied to all user equipments (UE) within a single cell. As a result, collision between different user equipments (UE) can foe avoided in PUSCH transmission.

Figure 3:
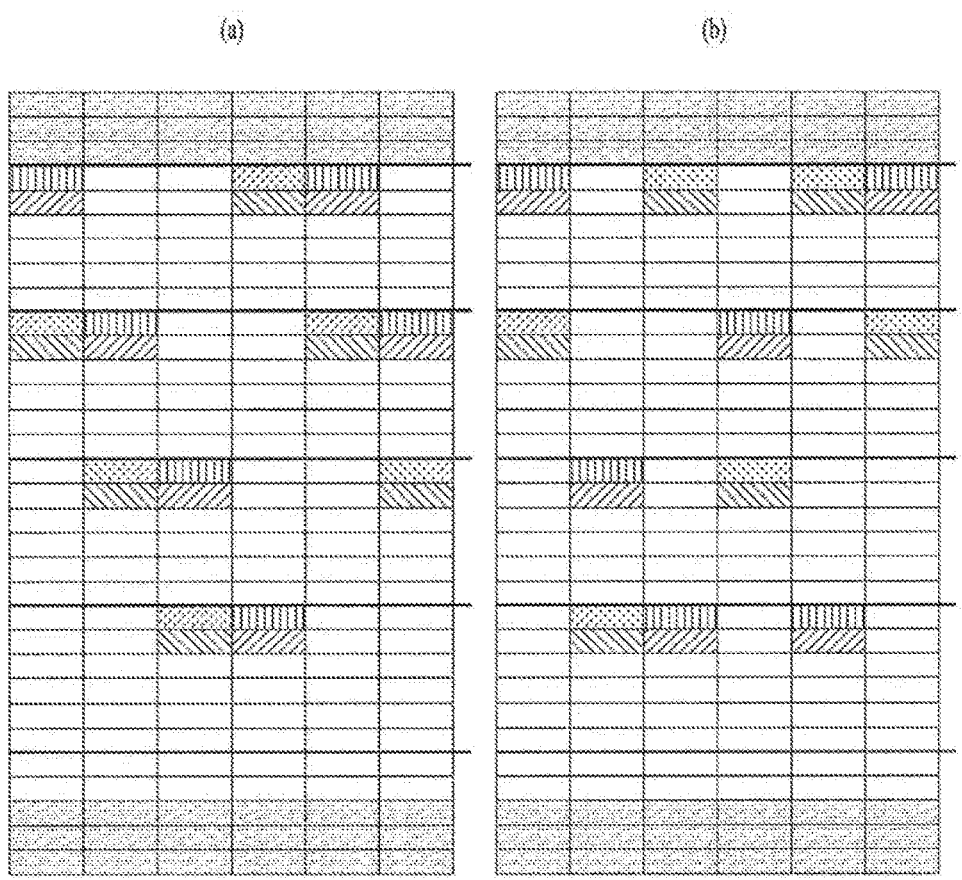
FIG. 3 is a diagram illustrating a method of using subband hopping according to one embodiment of the present invention in detail.

FIG. 3 is a diagram illustrating a method of using subband hopping according to one embodiment of the present invention in detail.

Subband hopping according to the embodiment of the present invention can be performed simply by a(t)=1. (a) of FIG. 3 illustrates an example where one subband shifts per transmission slot (subframe) as a(t)=1 is set as above. Meanwhile, (b) of FIG. 3 illustrates an example where a(t) is randomly set to a cell specific random number.

As described above, since subband hopping in the embodiment of the present invention is commonly applied to uplink signal transmission of all user equipments (UE0 within a cell, collision between different user equipments for signal transmission can be avoided.

Meanwhile, if the aforementioned subband hopping is used in connection with FIG. 2 and FIG. 3, uplink signal transmission of one user equipment is preferably performed through the same subband.

Figure 4:
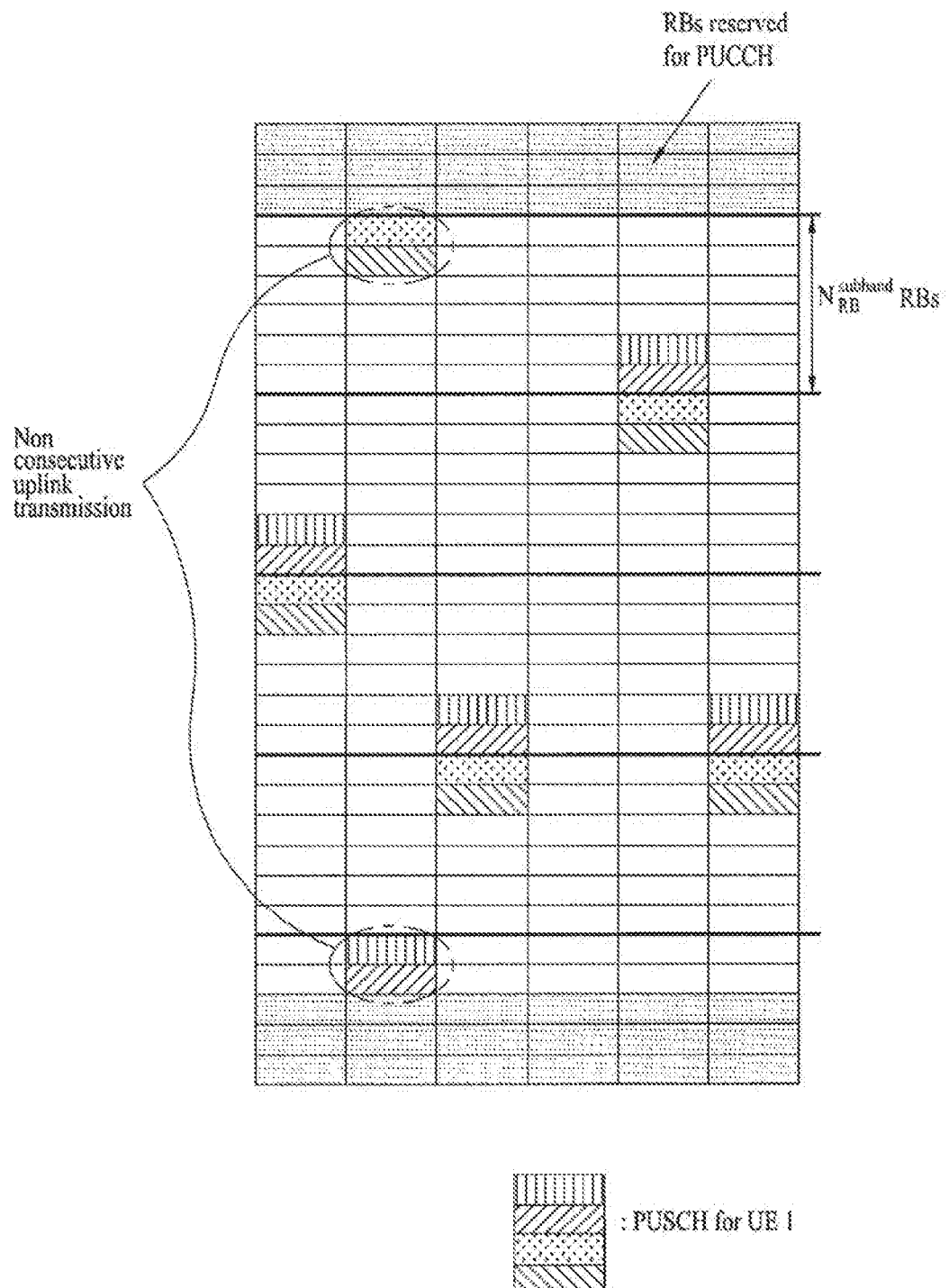
FIG. 4 is a diagram illustrating a problem that may occur when uplink transmission of one user equipment is not performed within one subband in a state that subband hopping is performed in accordance with one embodiment of the present invention.

FIG. 4 is a diagram illustrating a problem that may occur when uplink transmission of one user equipment is not performed within one subband in a state that subband hopping is performed in accordance with one embodiment of the present invention.

As illustrated in FIG. 4, if uplink signal transmission of one user equipment is performed for two subbands, the uplink signal transmission of one user equipment can be performed through a non-continuous frequency band in accordance with the subband hopping pattern. In FIG. 4, if a PUSCH signal of user equipment UE1 is transmitted to two subbands in slot 0, PUSCH transmission of the user equipment UE1 is performed through a non-continuous frequency band in slot 1 in accordance with the subband hopping pattern, whereby a single carrier feature is lost in uplink transmission. Accordingly, the embodiment of the present invention suggests that uplink signal transmission of one user equipment (UE) is performed through a single subband.

Meanwhile, although it is assumed that RB index used in a previous slot (or subframe) is used as the reference index in the Equation 1, another reference index can be used as described above. For example, RB index initially allocated by persistent scheduling command or RB index with respect to initial transmission or random retransmission by dynamic scheduling command can be used as the reference RB index. At this time, $a(t)*N_{sb}$ represents shift from the SB index scheduled as above to RB index used for uplink transmission at a specific time.

In the aforementioned subband hopping according to the embodiment of the present invention, interference randomization can be acquired by applying a cell-specific random number a(t). Also, frequency diversity can foe acquired using $N_{sb}$ number of hopping patterns. Moreover, an uplink signal transmitted from one user equipment is allocated to one subband so that a single carrier feature can be maintained in uplink transmission.

For the aforementioned frequency hopping, the embodiment of the present invention suggests the following signaling information.

First of all, in order to specify a frequency hopping mode, i.e., in order, to inform whether mirroring or subband hopping is used, it is preferable that broadcast or RRC signaling information of 1 bit is received. Also, it is preferable that signaling information for uplink scheduling grant is received. This uplink scheduling grant can be used for on/off signaling of frequency hopping with 1 bit, and can be received through a physical downlink control channel (PD-CCH).

Furthermore, it is preferable that signaling of the number $N_{sb}$ of subbands within the system band and the number $N_{RB}^{sb}$ of RBs included in the subband is received. If any one of signaling of the number of $N_{sb}$ of subbands and signaling of the number $N_{RB}^{sb}$ of RBs is identified, the other one can be identified. Accordingly, it is more efficient that any one of signaling of the number of $N_{sb}$ of subbands and signaling of the number $N_{RB}^{sb}$ of RBs is performed. Although the embodiment of the present invention suggests that $N_{RB}^{sb}$ is get to have a range of 10-50 RBs and received as signaling information of 6 bits, $N_{RB}^{sb}$ is not limited to the above embodiment.

In the Equation 1, a(t) can be generated by m-sequence generator. Also, synchronization between different user equipments (UE) can be performed through RRC signaling for the sequence generator status or RRC signaling for relationship between the m-sequence generator status and system frame number.

Meanwhile, the aforementioned frequency hopping can be performed by inter-subframe hopping, inter-slot hopping or their combination.

Figure 5:
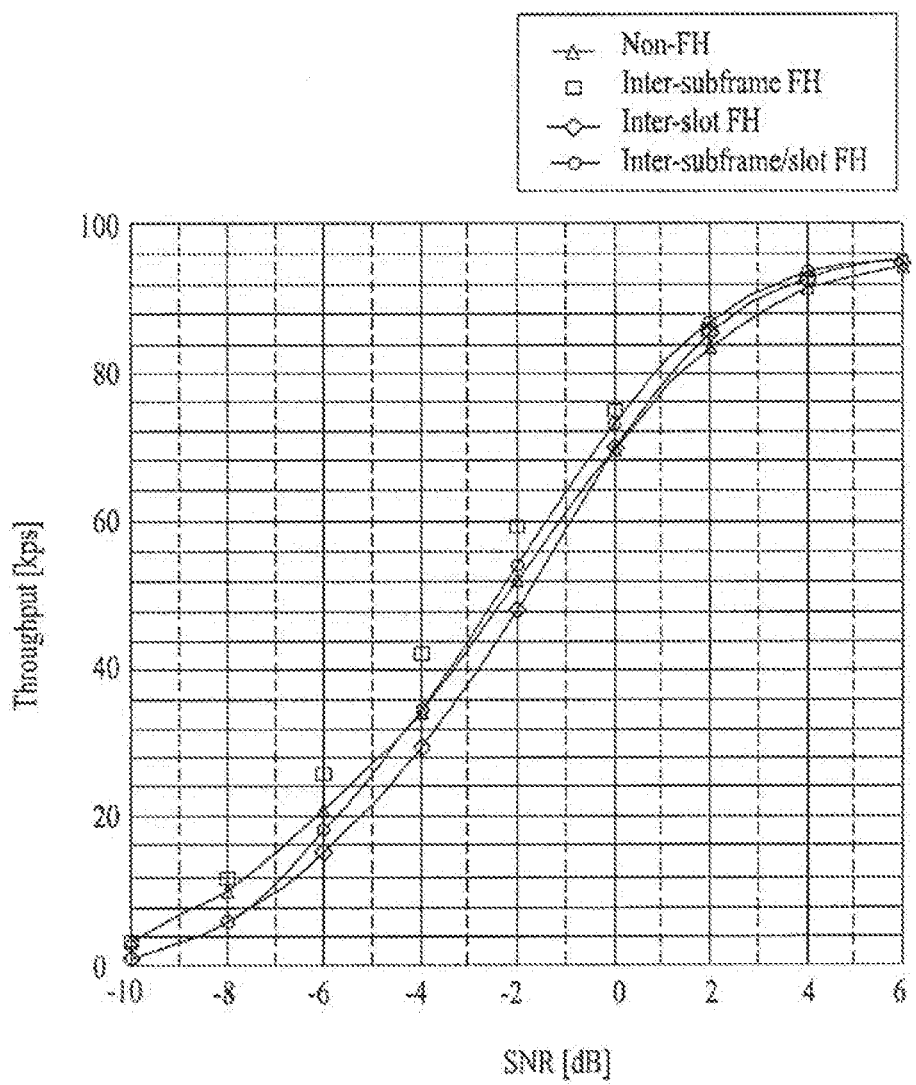
FIG. 5 is a graph illustrating a graph, which compares four kinds of performance that can combine inter-subframe hopping with inter-slot hopping to identify their performance.

FIG. 5 is graph illustrating a graph, which compares four kinds of performance that can combine inter-subframe hopping with inter-slot hopping to identify their performance.

In more detail, FIG. 5 illustrates a link-level processing rate for a case where inter-subframe frequency hopping is only performed, a case where inter-slot frequency hopping is only performed, and a case where both inter-subframe frequency hopping and inter-slot frequency hopping are performed.

According to the result illustrated in FIG. 5, inter-subframe hopping represents a relatively high processing rate in a low SNR region, and combination of inter-subframe hopping and inter-slot hopping represents a relatively high processing rate in a high SNR region.

Accordingly, the preferred embodiment of the present invention suggests that an inter-subframe hopping mode is used as a basic hopping mode and inter-slot hopping is semi-statically powered on/off.

Meanwhile, the embodiment of the present invention suggests that subband based mirroring is additionally applied to the aforementioned subband hopping. Namely, in the embodiment of the present invention, a cell-specific mirroring for RBs included in each subband is defined in such a manner that the cell-specific mirroring is added to a hopping pattern fey cell-specific cyclic shift, whereby frequency hopping is performed.

Figure 6:
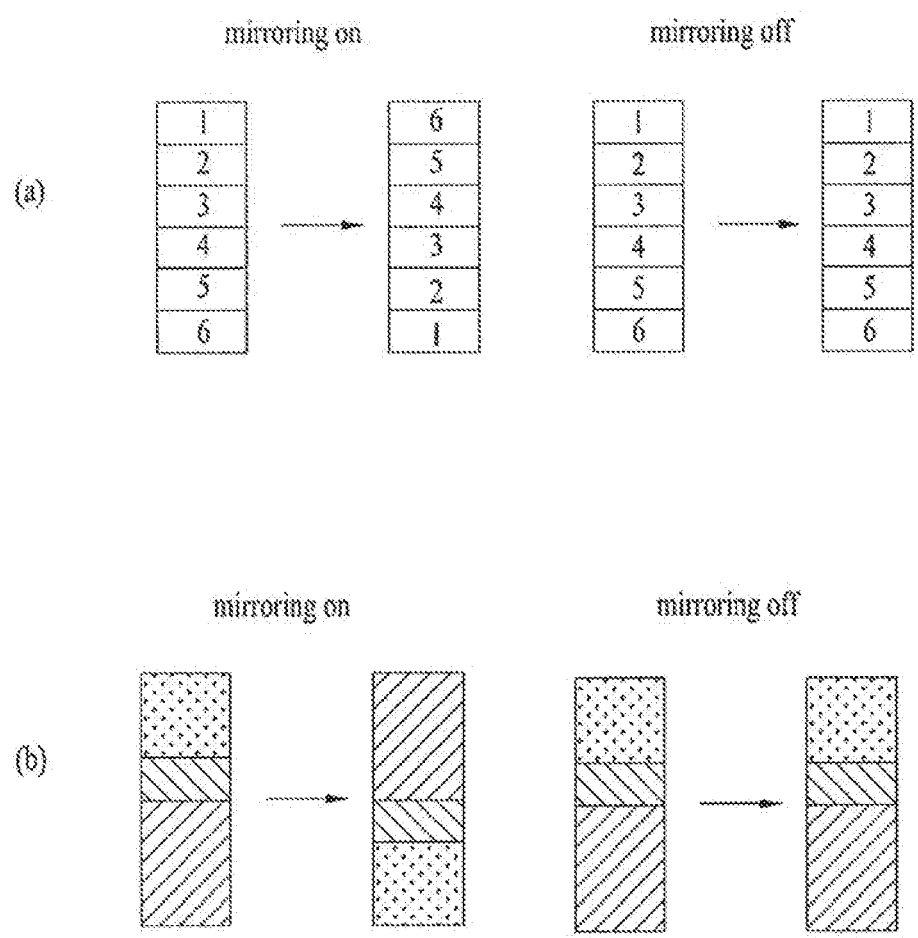
FIG. 6 is a diagram illustrating a concept of subband based mirroring in accordance with one embodiment of the present invention.

FIG. 6 is a diagram illustrating a concept of subband based mirroring in accordance with one embodiment of the present invention.

In more detail, (a) of FIG. 6 illustrates a case where subband based mirroring is performed and a case where subband based mirroring is not performed under the assumption that one subband includes six RBs. Namely, if it is assumed that number within each RB is RB index in (a) of FIG. 6, RB index is arranged in a reverse order based on a center frequency in the RB within the subband when mirroring is performed within the subband. Meanwhile, (b) of FIG. 6 illustrates a case where transmission packets of different user equipments multiplexed within a specific subband undergo mirroring in next transmission unit and a case where the transmission packets do not undergo mirroring.

The embodiment of the present invention suggests a method of improving frequency diversity gain and inter-cell interference randomization by combining cell-specific cyclic shift type hopping of the subband unit with on/off of cell-specific mirroring within each subband. More particularly, the embodiment of the present invention suggests that on/off pattern of cell-specific mirroring is equally applied to all subbands for a specific TTI of a specific cell so as to simplify a frequency hopping pattern.

Figure 7:
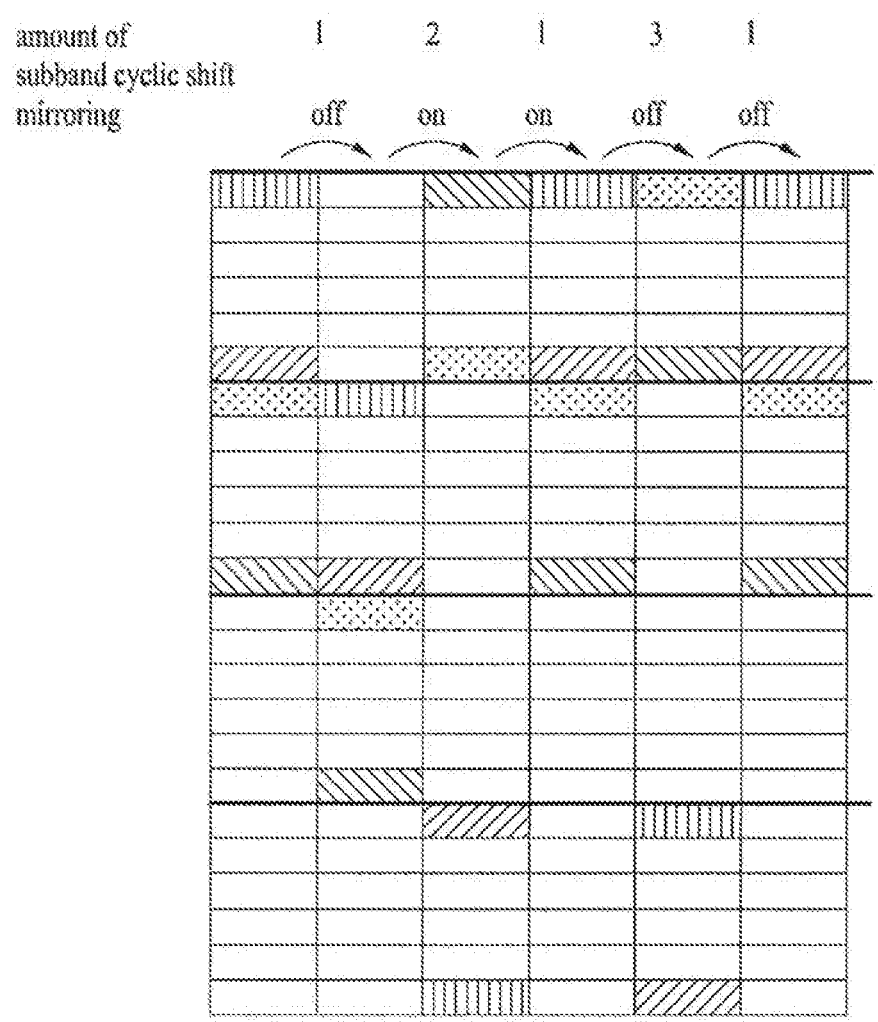
FIG. 7 is a diagram illustrating an example of combining subband hopping with subband based mirroring in accordance with one embodiment of the present invention.

FIG. 7 is a diagram illustrating an example of combining subband hopping with subband based mirroring in accordance with one embodiment of the present invention.

In the example of FIG. 7, the PUSCH transmission band is divided into four subbands. A mirroring pattern represents whether a random transmission slot (or subframe) applies mirroring of a previous subband to a previous transmission slot (or subframe). Also, a subband hopping pattern represents whether a random transmission slot (or subframe) applies cyclic shift corresponding to several subframes) to a previous transmission slot (or subframe). However, as described above, subband hopping can be used in such a manner that RB index for cyclic shift is defined based on RB index allocated through scheduling with respect to initial transmission or random retransmission not previous slot (or subframe).

Hereinafter, for convenience of description, the amount $(a(t)*N_{RB}^{sb})$ of index cyclically shifted based on the reference index in accordance with subband hopping is represented as m, and the number $N_{sb}$ of subbands is represented as M.

Hereinafter, a method of defining m value sequence and mirroring on/off sequence in detail under the above assumption, will be described.

First of all, a method of defining the aforementioned m value sequence and mirroring on/off sequence respectively will be described.

In the embodiment of the present invention, a method of generating a cell-specific m value sequence between the base station and the user equipment within each cell and a method of generating a cell-specific mirroring on/off sequence are respectively defined. Then, the embodiment of the present invention suggests that frequency hopping transmission and reception are performed, by combination of the two sequences. In more detail, the two sequences can be generated using different maximum length sequences.

For example, a cyclic shift pattern of a total of m subbands can be obtained in such a manner that a clock of a m-sequence generator having a specific length increases per transmission time and at the same time the following calculation is performed for a shift register state value 'a' of the m-sequence generator.

If $0 \leq m \leq M-1$ is defined, $m = a \bmod M$     [Equation 2]

However, if the value m generated by the above Equation 2 includes 0, in which the same index as the previous RB index (or reference RB index) is used. The embodiment of the present invention suggests that the following calculation is used to prevent RB index used for uplink signal transmission at a specific time from being identical with the RB index (or reference RB index) used during previous transmission.

If $1 \leq m \leq M-1$ is defined, $m = (a \bmod (M-1))+1$     [Equation 3]

In other words, modular calculation is performed for the shift register state value 'a' of the m-sequence generator using an integer obtained by subtracting 1 from the number M of subbands. And, 1 is added to the modular calculation value to avoid m=0. The embodiment of the present invention suggests that the value m is defined through the above calculation or another calculation which includes the above calculation.

Meanwhile, m value patterns of different cells can be obtained in such a manner that different phase offsets of the m-sequence generator are given to different cells.

Likewise, the mirroring on/off pattern can be defined in such a manner that a value of 0 and a value of 1 are respectively mapped with on/off or off/on with respect to independent m-sequences. Alternatively, one bit of the shift register status value used to generate a cyclic shift pattern of a cell-specific subband is used as the mirroring on/off pattern so that load required to generate two independent random sequences is reduced.

At this time, if the value m represents the amount of cyclic shift for reference transmission not cyclic shift for previous transmission, the value m should be changed per transmission so that the value m is not regarded as the same cyclic shift amount as the previous cyclic shift amount, whereby the same subband is not used for continuous transmission. Namely, when possible cyclic shift of a total of M number of subbands from 0 to M−1 subbands exists, M−1 number of m values from 1 to M−1 are generated per transmission time. In this case, it is suggested that the generated m values are mapped with M−1 number of cyclically shifted values excluding cyclically shifted value mapped with the value m generated at the previous transmission time among M number of cyclically shifted values.

Similarly, one of M number of values from 0 to M−1 is generated as the m value. If the same m value as the m value generated during previous transmission is generated, a specific integer b(b≠0, |b|<M) is added to the generated value and modular calculation is performed using M, whereby a value different from the previously generated value m can be obtained.

Next, a method of defining a combined pattern of the aforementioned m value sequence and the mirroring on/off sequence will be described.

Supposing that M−1 member of possible m values exist, a total of (M−1)*2 number of combined patterns of the possible m values and the mirroring on/off sequence are obtained. Accordingly, the (M−1)*2 number of combined patterns are previously mapped with values between 0 and (M−1)*2−1 and then cell-specific random number sequences having values between 0 and (M−1)*2−1 are generated. In this way, the cell-specific frequency hopping pattern can be used.

At this time, the random sequences between 0 and (M−1)*2−1 can be generated using m-sequence (maximum length sequence). Namely, the random sequences can be obtained in such a manner that the clock of the m-sequence generator having a specific length increases per transmission time and at the same time the following calculation is performed for the cyclic shift state value: 'a' of the m-sequence generator.

If $0 \leq m \leq M-1$ is defined; $m = (a \bmod(M*2))$

If $1 \leq m \leq M-1$ is defined; $m = (a \bmod((M-1) \times 2))$     [Equation 4]

At this time, patterns of different cells can be obtained in such a manner that different phase offsets are given to the different cells.

In this case, (M−1)*2 number of m values are divided into M−1 number of pairs mapped with mirroring on and mirroring off within the amount of a single subband cyclic shift. Also, if cyclic shift is defined for the reference RB index not the previous transmission RB index, M−1 number of possible m value pairs should be changed per transmission so that the m values are not regarded as the same cyclic shift amount as the previous cyclic shift amount, thereby preventing signal transmission from being performed through a single subband in continuous transmission. Namely, when the amount of possible cyclic shifts of a total of M number of subbands from 0 to M−1 subbands exists, the m value pairs are mapped with the subband cyclically shifted values so that the m values generated per transmission time are mapped with M−1 number of cyclically shifted values excluding cyclically shifted value, mapped with the m value generated at the previous transmission time among M number of cyclically shifted values.

Similarly, one of 2M number of values from 0 to 2M−1 is generated as the m value. If the same m value, which is mapped with cyclic shift, as the m value generated during previous transmission is generated, a specific integer b(b≠0, |b|<M) is added to the cyclically shifted value and modular calculation is performed using M, whereby a value different from the previously generated value m can be obtained.

Additionally, even if the m is equal to 0, continuous transmission is performed through different frequency bands when mirroring is in on state, whereby minimum frequency diversity and interference randomization can be obtained. Accordingly, the m values are 0–M−1 and 2*M−1 number of combined patterns except for m=0 and mirroring=off among 2*M number of combined patterns obtained through mirroring on/off are mapped with 2*M−1 numbers (for example, 0, 1, . . . , 2M−2). Then, random number sequences within the above numbers are generated. In this way, the cell-specific frequency hopping pattern can be used.

Furthermore, when the data transmission band is divided into M number of subbands, the number of RBs within each subband may be different from that within another subband if the number of RBs of the data transmission band is not divided exactly by M. The reason why that frequency hopping is defined in subband unit in the SC-FDMA system is that packet transmission of one user equipment is performed through continuous subcarriers to maintain a low PAPR feature. Accordingly, in a state that different bandwidths or RBs exist in different subbands, if the number of RBs in a subband of a minimum bandwidth is defined as RB', it is preferably limited that RBs less than RB' are only allocated for packet transmission to which frequency hopping pattern using subband is applied.

Meanwhile, the aforementioned frequency hopping pattern can be used for each interlace where HARQ process is operated, or can be used in slot unit within each interlace.

Particularly, in the system to which synchronous HARQ is applied, since retransmission of same packets of a random user equipment (UE) is performed at a fixed slot interval, a hopping sequence pattern is preferably operated for each interlace where HARQ process is operated.

Figure 8:
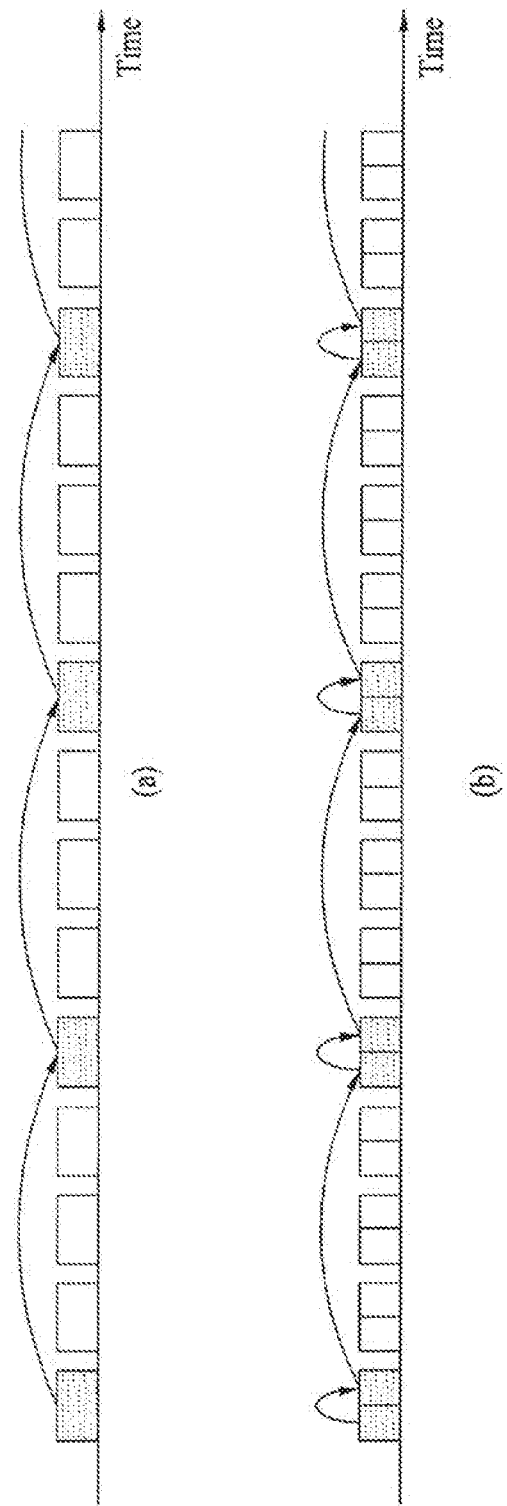
FIG. 8 is a diagram illustrating a concept of frequency hopping performed for each interlace for HARQ process in accordance with one embodiment of the present invention.

FIG. 8 is a diagram illustrating a concept of frequency hopping performed for each interlace for process in accordance with one embodiment of the present invention.

In detail, (a) of FIG. 8 illustrates a case where four HARQ processes are defined in the system and frequency hopping is applied in subframe (or packet) unit. In this case, the hopping pattern sequence is operated for each HARQ process. Also, in (b) of FIG. 8, one packet is divided into two slots for frequency hopping. At this time, the hopping pattern sequence is operated for each HARQ process in slot unit.

In more detail, a frequency hopping sequence a(n) of a random cell can be defined as follows.

$$a(n)=m(n) \text{modulo } N \qquad \text{[Equation 5]}$$

In the Equation 5, m(n) is an output value using a generator which generates integers more than 0. Particularly, the generator could be m-sequence generator. More particularly, different cells may have different initial values (or phase values) of a shift register which includes m-sequence generator.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The aforementioned embodiments of the present invention can equally be applied to various wireless communication systems, which seek diversity gain through frequency hopping, as well as the 3GPP LTE system.

What is claimed is:

1. A method for performing, by a user equipment, physical uplink shared channel (PUSCH) transmission in a time domain transmission unit, the method comprising:
   receiving frequency hopping on/off information through a physical downlink control channel (PDCCH) carrying scheduling information for the PUSCH transmission; and
   performing the PUSCH transmission on a resource block in the time domain transmission unit according to a predetermined hopping pattern if the frequency hopping on/off information indicates a frequency hopping on,
   wherein the predetermined hopping pattern is defined by a subband hopping performed over subbands and a mirroring on/off, and
   wherein the subband hopping is defined using a first integer obtained from a first random sequence, and the mirroring on/off is determined based on a second random sequence separate from the first random sequence.

2. The method of claim 1, wherein the first integer is given using the first random sequence and using calculation operation which comprises:
   performing modular calculation of: (a value generated based on the first random sequence) mod ($N_{sb}-1$), where "$N_{sb}$" is a number of subbands for the subband hopping; and
   adding 1 to the modular calculated value.

3. The method of claim 1, wherein the subband hopping is defined such that a resource block index, RB, of the resource block used for the PUSCH transmission is given based on:
   RB=(a reference index+(the first integer)*$N^{sb}_{RB}$)) mod ($N^{sb}_{RB}$*$N_{sb}$), where "$N_{sb}$" is a number of subbands for the subband hopping and "$N^{sb}_{RB}$" is a number of resource block in each subband.

4. The method of claim 3, wherein the reference index is determined based on the scheduling information.

5. The method of claim 3, wherein the predetermined hopping pattern is defined within "$N^{sb}_{RB}$*$N_{sb}$" resource blocks, and the "$N^{sb}_{RB}$*$N_{sb}$" resource blocks is within a uplink system band configured with $N^{UL}_{RB}$ resource blocks excluding a predetermined number of resource blocks from each end of the uplink system band.

6. A user equipment for performing physical uplink shared channel (PUSCH) transmission in a time domain transmission unit, the user equipment comprising:
   a receiver,
   a transmitter, and
   a processor configured to control the receiver and the transmitter, the processor configured to:
   control the receiver to receive frequency hopping on/off information through a physical downlink control channel (PDCCH) carrying scheduling information for the PUSCH transmission; and
   control the transmitter to perform the PUSCH transmission on a resource block in the time domain transmission unit according to a predetermined hopping pattern if the frequency hopping on/off information indicates a frequency hopping on,
   wherein the predetermined hopping pattern is defined by a subband hopping performed over subbands and a mirroring on/off, and
   wherein the subband hopping is defined using a first integer obtained from a first random sequence, and the mirroring on/off is determined based on a second random sequence separate from the first random sequence.

7. The user equipment of claim 6, wherein the first integer is given using the first random sequence and using calculation operation which comprises:
   performing modular calculation of: (a value generated based on the first random sequence) mod ($N_{sb}-1$), where "$N_{sb}$" is a number of subbands for the subband hopping; and
   adding 1 to the modular calculated value.

8. The user equipment of claim 6, wherein the subband hopping is defined such that a resource block index, RB, of the resource block used for the PUSCH transmission is given based on:
   RB=(a reference index+(the first integer)*$N^{sb}_{RB}$)) mod ($N^{sb}_{RB}$*$N_{sb}$), where "$N_{sb}$" is a number of subbands for the subband hopping and "$N^{sb}_{RB}$" is a number of resource block in each subband.

9. The user equipment of claim 8, wherein the reference index is determined based on the scheduling information.

10. The user equipment of claim 8, wherein the predetermined hopping pattern is defined within "$N^{sb}_{RB}*N_{sb}$" resource blocks, and the "$N^{sb}_{RB}*N_{sb}$" resource blocks is within a uplink system band configured with $N^{UL}_{RB}$ resource blocks excluding a predetermined number of resource blocks from each end of the uplink system band.

11. A method for receiving, by a base station, physical uplink shared channel (PUSCH) transmission in a time domain transmission unit, the method comprising:
transmitting frequency hopping on/off information through a physical downlink control channel (PDCCH) carrying scheduling information for the PUSCH transmission; and
receiving the PUSCH transmission on a resource block in the time domain transmission unit according to a predetermined hopping pattern if the frequency hopping on/off information indicates a frequency hopping on,
wherein the predetermined hopping pattern is defined by a subband hopping performed over subbands and a mirroring on/off, and
wherein the subband hopping is defined using a first integer obtained from a first random sequence, and the mirroring on/off is determined based on a second random sequence separate from the first random sequence.

12. The method of claim 11, wherein the first integer is given using the first random sequence and using calculation operation which comprises:
performing modular calculation of: (a value generated based on the first random sequence) mod ($N_{sb}$−1), where "$N_{sb}$" is a number of subbands for the subband hopping; and
adding 1 to the modular calculated value.

13. The method of claim 11, wherein the subband hopping is defined such that a resource block index, RB, of the resource block used for the PUSCH transmission is given based on
RB=(a reference index+(the first integer)*$N^{sb}_{RB}$)) mod ($N^{sb}_{RB}*N_{sb}$), where "$N_{sb}$" is a number of subbands for the subband hopping and "$N^{sb}_{RB}$" is a number of resource block in each subband.

14. The method of claim 13, wherein the reference index is determined based on the scheduling information.

15. The method of claim 13, wherein the predetermined hopping pattern is defined within "$N^{sb}_{RB}*N_{sb}$" resource blocks, and the "$N^{sb}_{RB}*N_{sb}$" resource blocks is within a uplink system band configured with $N^{UL}_{RB}$ resource blocks excluding a predetermined number of resource blocks from each end of the uplink system band.

16. A base station for receiving physical uplink shared channel (PUSCH) transmission in a time domain transmission unit, the base station comprising:
a transmitter,
a receiver, and
a processor configured to control the transmitter and the receiver, the processor configured to:
control the transmitter to transmit frequency hopping on/off information through a physical downlink control channel (PDCCH) carrying scheduling information for the PUSCH transmission; and
control the receiver to receive the PUSCH transmission on a resource block in the time domain transmission unit according to a predetermined hopping pattern if the frequency hopping on/off information indicates a frequency hopping on,
wherein the predetermined hopping pattern is defined by a subband hopping performed over subbands and a mirroring on/off, and
wherein the subband hopping is defined using a first integer obtained from a first random sequence, and the mirroring on/off is determined based on a second random sequence separate from the first random sequence.

17. The base station of claim 16, wherein the first integer is given using the first random sequence and using calculation operation which comprises:
performing modular calculation of: (a value generated based on the first random sequence) mod ($N_{sb}$−1), where "$N_{sb}$" is a number of subbands for the subband hopping; and
adding 1 to the modular calculated value.

18. The base station of claim 16, wherein the subband hopping is defined such that a resource block index, RB, of the resource block used for the PUSCH transmission is given based on
RB=(a reference index+(the first integer)*$N^{sb}_{RB}$)) mod ($N^{sb}_{RB}*N_{sb}$), where "$N_{sb}$" is a number of subbands for the subband hopping and "$N^{sb}_{RB}$" is a number of resource block in each subband.

19. The base station of claim 18, wherein the reference index is determined based on the scheduling information.

20. The base station of claim 18, wherein the predetermined hopping pattern is defined within "$N^{sb}_{RB}*N_{sb}$" resource blocks, and the "$N^{sb}_{RB}*N_{sb}$" resource blocks is within a uplink system band configured with $N^{UL}_{RB}$ resource blocks excluding a predetermined number of resource blocks from each end of the uplink system band.

* * * * *